Figure 10:
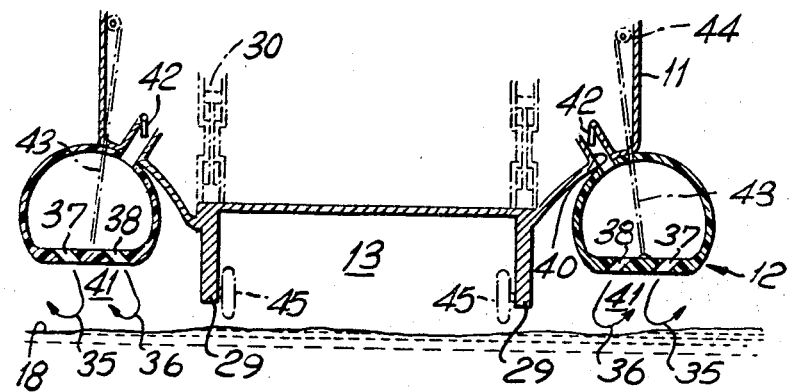

Sept. 3, 1968 R. D. HUNT 3,399,644
GAS-CUSHION VEHICLES
Filed Nov. 9, 1966 3 Sheets-Sheet 1
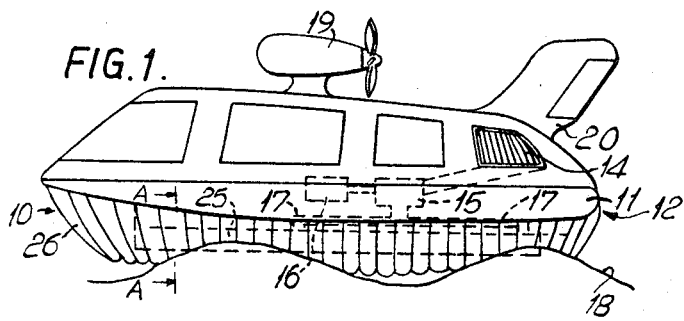
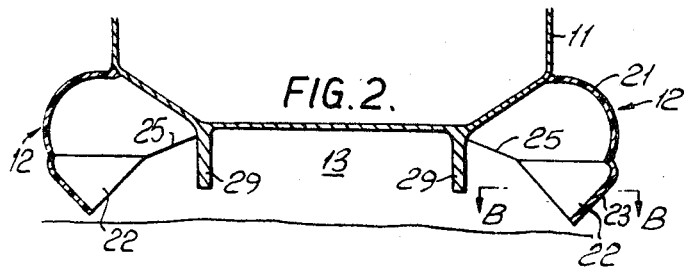
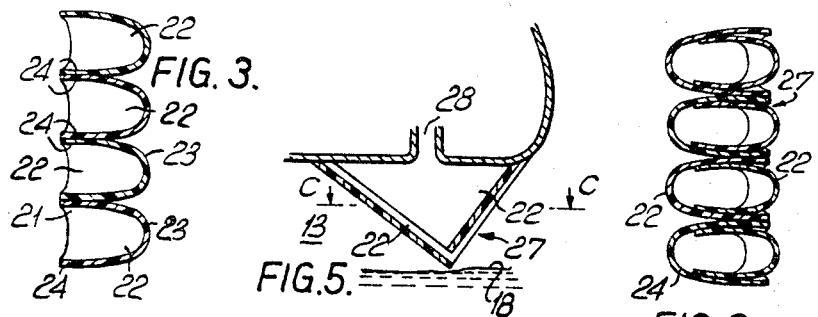
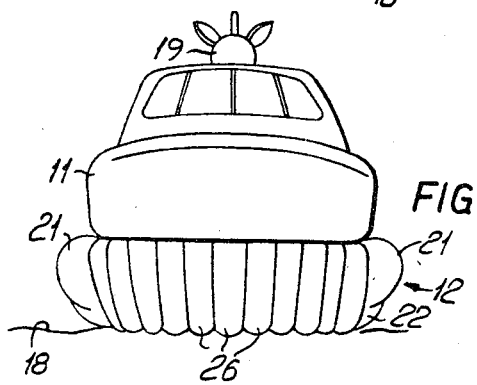
INVENTOR
R. D. HUNT
BY
Cameron, Kerkam & Sutton
ATTORNEYS

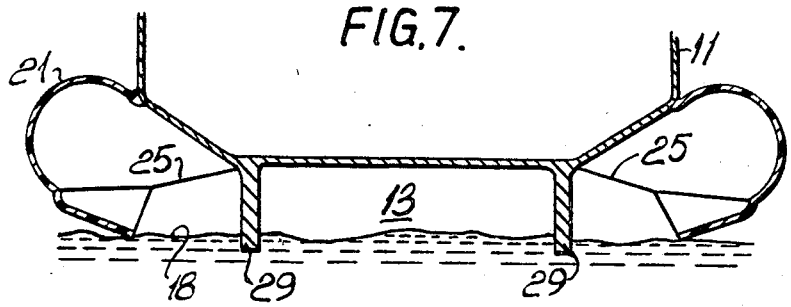
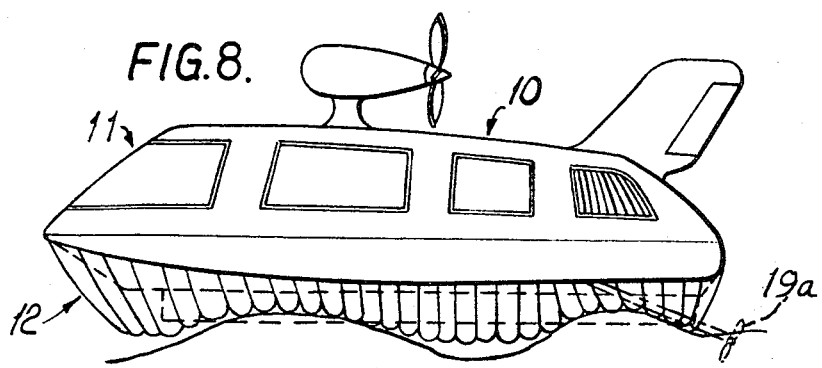
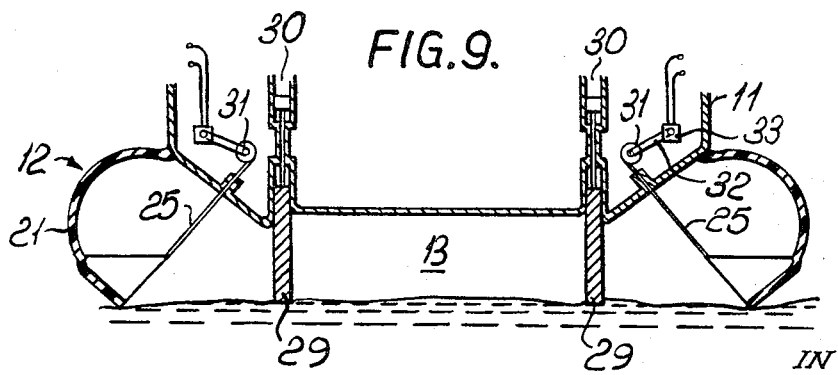

United States Patent Office 3,399,644
Patented Sept. 3, 1968

3,399,644
GAS-CUSHION VEHICLES
Rowland Delville Hunt, Hythe, England, assignor to Hovercraft Development Limited, London, England, a British company
Filed Nov. 9, 1966, Ser. No. 593,124
Claims priority, application Great Britain, Nov. 11, 1965, 47,962/65
5 Claims. (Cl. 114—67)

The present invention relates to gas cushion vehicles, that is to say, to vehicles which, in operation, are at least partly supported above a surface by a cushion of pressurised gas formed and contained beneath the vehicle body. The invention is particularly concerned with gas cushion vehicles of the type in which, in operation, the cushion is laterally contained, at least in part, by a downwardly extending flexible skirt formed from flexible sheet material (such as rubber sheet or rubberised fabric) either alone or in combination with a curtain of moving fluid which is continuously discharged downwardly from the skirt during operation of the vehicle.

Previously-known gas cushion vehicles of this type are capable of travelling over water or land surfaces, and are intended to operate out of contact with the surface, although in practice, this intended mode of operation is not always achieved due to irregularities on the surface. However, previously-known vehicles are sufficiently free of surface contact to be affected by wind and other extraneous influences, such as the slope of the surface, which can upset directional control.

It is an object of the present invention to provide a gas cushion vehicle of the said type having improved directional control.

According to the present invention, there is provided a gas cushion vehicle comprising a skirt formed, at least in part, from flexible sheet material for laterally containing the vehicle-supporting gas cushion, and a keel structure extending downwardly from the bottom of the vehicle body with its length substantially parallel to the fore-and-aft axis of the vehicle and which is at least partly surrounded by the flexible skirt, the relative downward extents of the skirt and the keel structure being variable.

The relative downward extents of the skirt and the keel structure from the body may be varied, in operation, so that the keel structure either contacts the surface or is substantially clear of the surface, or contacts the surface from time to time. The keel structure is intended to provide a relatively small resistance to movement of the vehicle relative to the surface in directions parallel to the fore-and-aft axis of the vehicle and a relatively large resistance to movement of the vehicle relative to the surface in directions transversely of the fore-and-aft axis. During operation of the vehicle over hard land surfaces, the keel structure may contact and skid along the surface while during operation over water or mud, the keel structure may contact and penetrate the surface.

The interaction between the keel structure and the surface beneath the vehicle may also be utilised, in the known manner, in conjunction with steering means such as an aerodynamic or hydrodynamic rudder, to provide turning forces on the vehicle for turning the vehicle from one direction of motion to another direction of motion.

At least an upper part of the skirt may, in operation, be maintained out of contact with the surface over which the vehicle operates so that there will be a clearance between at least the upper part of the skirt and the surface. This clearance enables gas which is excessive to cushion-maintenance requirements to escape, and it will be appreciated that if the supply of gas to the cushion is reduced, the clearance may decrease and the vehicle body will sink towards the surface. The vehicle may be so arranged that a selected decrease in the clearance, occasioned by reducing the supply of gas to the gas cushion, causes the vehicle body to sink towards the surface until the keel structure contacts the surface to a required degree.

The vehicle may be operated with the relative depths of the keel structure and the skirt arranged so that contact between the surface and any part of the keel structure occurs only from time to time. In one such mode of operation, the relative depths of the skirt and the keel structure are arranged to be such that, during travel over water, only the crests of waves having an amplitude exceeding a selected amplitude contact and immerse the bottom portion of the keel structure. This mode of operation can be employed to utilise the association commonly met between wave amplitude and wind strength so that when during travel over water the strength of transverse components of the forces due to the wind necessitate a degree of immersion of the keel structure to provide directional control, the crests of the waves will immerse the keel structure to provide substantially the correct degree of resistance to transverse movement of the vehicle relative to the water.

Generally speaking, the preferred mode of operation of the vehicle will be a compromise between the required improvement in directional control and the amount of drag produced by contact between the keel structure and the surface over which the vehicle is to operate.

The vehicle may comprise activating means operable to vary the distance between the vehicle body and at least the bottom of the keel structure. The keel structure may be of substantially rigid construction and movably mounted relative to the vehicle body, the said activating means then being operable to cause the keel structure to move relative to the vehicle body. A water-screw propeller may be rotatably mounted on the keel structure for propelling the vehicle over water. In another construction, the keel structure may be hollow and formed, at least in part, from flexible sheet material, the said activating means then being operable to regulate the degree of inflation of the keel structure so that when, in operation, the pressure of the inflating fluid exceeds that of the vehicle-supporting gas cushion, the keel structure is downwardly inflated for contact with the surface, and when the pressure of the fluid is less than the pressure of the gas cushion, the keel structure is upwardly collapsed against the bottom of the vehicle body.

The said upper part of the skirt may be attached to the periphery of the vehicle body and may be inflatable by gas which, in operation, is laterally containable by the said upper part of the skirt to a form in which, in vertical cross-section normal to the periphery of the gas-cushion, it extends generally outwardly from the vehicle body, then downwardly and inwardly in a substantially smooth curve.

There may be provided a membrane of flexible sheet material which depends from the vehicle body inwardly of the flexible skirt and defines therewith a space for receiving an inflating gas for inflating the skirt. The skirt and the membrane may define a port from which a curtain of fluid can be downwardly discharged to provide lateral containment of the gas cushion, in operation, below the level of the skirt. The skirt and the membrane may define at least two ports parallel to the periphery of the vehicle-supporting gas cushion and arranged for discharging parallel curtains of gas downwardly whereby to form a subsidiary gas cushion substantially beneath the skirt. There may be means operable for varying the rate of discharge of curtain-forming gas from the, or each, port.

There may be means for constraining the flexible sheet material of the keel structure so that the keel structure assumes substantially a desired shape, when inflated.

There may also be provided at least one tie-cord connected between the internal surface of the hollow keel structure and retracting means associated with the vehicle body for retracting the keel structure towards the vehicle body. The vehicle may further comprise stiffening means, such as at least one nylon rib attached to the hollow keel structure and extending lengthwise thereof. The stiffening means may be attached at least on the bottom of the keel structure.

In addition, or alternatively, the vehicle may comprise means operable to vary the distance between the vehicle body and at least the bottom margin of the skirt, and the means may comprise at least one tie-cord connected between the skirt and retracting means associated with the vehicle body.

The vehicle may comprise a succession of wall elements attached to the bottom of the skirt side-by-side, each wall element comprising a wall portion which, in operation, extends downwardly away from the vehicle body, and side portions which extend inwardly from the downwardly extending sides of the wall portion, the adjacent side portions of neighbouring wall elements co-operating with each other, in operation, under the influence of pressurised gas contained by the wall portion whereby substantially to prevent the passage of pressurised gas between neighbouring wall elements. A skirt of this nature is described in U.K. patent specification No. 1,043,351.

Preferably the length of the keel structure is less than the distance between the front and rear sections of the cushion containing means so that, in operation, gas can circulate to all parts of the gas cushion.

The vehicle may comprise two or more of the said keel structures spaced apart from each other, and the keel structures may be so arranged and constructed as to be capable of supporting the weight of the vehicle; this is advantageous in that the flexible sheet material of the skirt will be subject to less crumpling by the weight of the vehicle than has previously been the case, and in that the underside of the vehicle body will be relatively accessible for inspection whilst supported on the keel structures. In instances where the keel structures are of flexible sheet material and inflatable, the keel structures distribute loadings fairly evenly on the vehicle body when the vehicle is at rest on an uneven land surface.

Where a plurality of keel structures are provided, there may be benefits in the roll stability of the vehicle during water-borne operation since during a roll of the vehicle to one side, there may be an increase in buoyancy on that side due to increased immersion of the keel structure(s) on that side, whilst there may be a decrease in buoyancy on the other side if the other keel structure(s) become less immersed.

Figure 11:
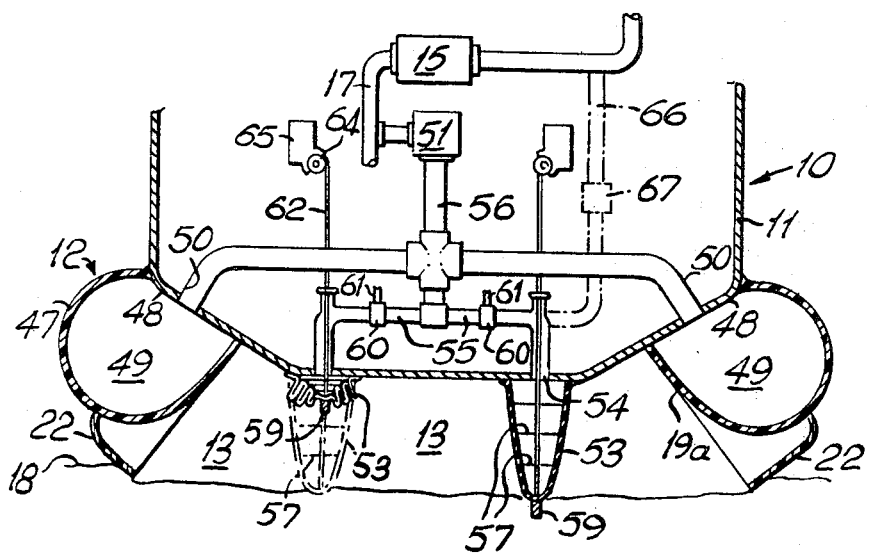

Embodiments of the invention, given by way of non-limitative example only, will now be described with reference to the accompanying drawings, in which FIGURE 1 is a side view of a gas cushion vehicle in accordance with the invention during operation, FIGURE 2 is a sectional view of the vehicle of FIGURE 1 taken in the plane A—A, FIGURE 3 is a sectional view taken in plane B—B of FIGURE 2, FIGURE 4 is a view looking towards the front of the vehicle of FIGURE 1, FIGURE 5 is a sectional view of the rear of the vehicle of FIGURE 1, FIGURE 6 is a sectional plan view of the rear of the vehicle of FIGURE 1, taken in the plane C—C of FIGURE 5, FIGURE 7 is a view corresponding to that of FIGURE 2 but showing the vehicle in another mode of operation, FIGURE 8 is a side view of a vehicle in accordance with the invention showing one mode of operation, FIGURE 9 is a view corresponding to that of FIGURE 2, but of a modification of the previous embodiment, FIGURE 10 is a view corresponding that of FIGURE 2 but of another embodiment according to the invention, and FIGURE 11 shows a view corresponding to that of FIGURE 2 but of yet another vehicle in accordance with the invention.

In the following description, an item which appears in more than one figure will be given the same reference numeral in all figures.

FIGURE 1 shows a gas cushion vehicle generally indicated by reference numeral 10 and which comprises a body 11 and a flexible skirt generally indicated by 12, formed from flexible sheet material such as rubber or rubberised fabric. The skirt 12, in operation, laterally bounds and contains a vehicle-supporting cushion of pressurised gas 13 beneath the body 11. In this instance, the pressurised gas is air which has been induced at intake 14 by a compressor 15, driven by a variable speed motor 16, and delivered to the space 13 by a number of ducts 17 (only two of which are depicted). The air cushion 13 supports the body 11 above the surface 18 over which the vehicle 10 operates. In the drawings, the surface 18, for the sake of illustration only, is a water surface but it should be understood that the surface 18 may equally well be a land surface. The vehicle 10 is propelled over the surface 78 by an air-screw propeller unit 19 and steered by an aerodynamic rudder 20 vertically hinged to the body 11 rearwardly of the propeller unit 19.

Referring now to FIGURES 2 and 3, the skirt 12 is seen to comprise an upper part in the form of a sheet 21 of flexible sheet material attached by an upper region to body 11, and to the lower region of which are secured a succession of wall elements 22 arranged side-by-side.

The sheet 21 depends from the bottom periphery of the vehicle and is inflated by the cushion 13 to a shape in which, in vertical cross-section normal to the periphery of the cushion 13, it extends outwardly away from the vehicle body 11 then downwardly and then inwardly in a substantially smooth curve. Each wall element 22 has been formed from a generally frusto-triangular piece of flexible material folded about its median to a U-shape, the arched region or wall portion 23 of the U-shape being attached by its upper margin to the sheet 21 and extending downwardly away from the vehicle body 11 with a somewhat inward inclination, and the adjacent side portions or limbs 24 of neighbouring U-shaped wall elements 22 co-operating under the inflating action of the air cushion 13, contained by the arched regions 23 of the wall elements 22, substantially to prevent the escape of pressurised air from between the wall elements 22. The free ends of the limbs 24 are restrained relative to the body 11 of the vehicle 10 against the outwardly-acting forces of the air cushion 13 by tie cords 25. As shown in FIGURES 1 and 4, the air cushion 13 is confined at the front of the vehicle 10 by a number of relatively tall wall elements 26 of substantially the same form as the wall elements 22 and which extend from the body 11 towards the surface 18. At the rear of the vehicle 10, as depicted in FIGURE 5, the air cushion 13 is confined by a number of double wall elements 27 comprising a pair of oppositely facing elements 22 which co-operate to form a "bag." Each "bag" is inflated by air from a duct 28, which may be connected to compressor 15, and adjacent "bags" co-operate when inflated to prevent the escape of cushion air therebetween. "Bags" of this type are described in detail in British patent application No. 24,356/65.

As will be seen from FIGURES 1 and 2, the vehicle 10 is provided with two spaced-apart rigid keel structures 29, formed from rigid material such as wood or metal, which extend downwardly from the vehicle body 11 and which are surrounded by the cushion-containing skirt 12. The keel structures 29 have a length parallel to the fore-and-aft axis of the vehicle 10 somewhat less than the distance between the front wall elements 26 and the rear double wall elements 27 so that a sufficient gap is left at each longitudinal end of the keel structures 29 for air to be distributed throughout the air-cushion 13, and are arranged with their lengths parallel to the fore-and-aft axis of the vehicle 10. The widths of the keel structures 29 are relatively small in relation to their lengths so that when the keel structures 29 are in contact with the surface 18, they will provide a relatively small resistance to movement of the vehicle 10 relative to the surface 18 parallel to the fore-and-aft axis of the vehicle 10 and a relatively large resistance to movement of the vehicle relative to the surface 18 transversely of the fore-and-aft axis.

When the vehicle 10 is to operate without requiring to resist transverse forces, such as those due to beam-on winds or when the influence of beam-on winds is insignificant in relation to the speed of the vehicle 10 (e.g. at high speeds), or during operation over land surfaces, due to a transverse component of inclination of the land surface, the mode of operation depicted in FIGURE 2 is preferred, in which the volume rate of air delivered to the air-cushion 13 is sufficient to elevate the body 11 relative to the surface 18 until the mean clearance between the lowest tips of wall elements 22 and the surface 18 through which excessive cushion air escapes is sufficiently great to raise the body 11 so that the keel structures 29 are maintained substantially clear of the surface 18.

However, when transverse forces, due for instance, to beam-on winds, act significantly on the vehicle 10, the mode of operation of FIGURE 7 is preferred in which the volume rate of air delivered to the air cushion 13 is so reduced that the mean clearance beneath the skirt 12 is reduced and the vehicle body 11 sinks allowing the two spaced-apart rigid keel structures 29 to contact and penetrate the surface 18 and interact with the water in the manner of a ship's keel to provide resistance to the tendency of the vehicle 10 to drift sideways relative to the water. This mode of operation would be most commonly preferred at low speeds when the effect of beam winds is more important, and when the drag forces due to the rigid keel structures 29 is relatively small. For higher speeds at times when the beam wind forces are neither insignificant nor very large, the preferred mode of operation would be between the two described modes, with the volume flow of air delivered to the cushion 13 adjusted so that the mean clearance beneath the wall elements 22 is sufficient for the crests of waves to wash sufficient of the lowest parts of the keel structures 29 to provide the required resistance to any transverse forces.

It has been recognised that, generally speaking, there is a relationship between the strength of the wind and the size of water waves associated with the wind. It is therefore possible to arrange that, with a substantially constant delivery of air to the air cushion 13, the vertical thickness of the cushion 13 is so maintained that in calm conditions, the mode of operation is as in FIGURE 2, whilst in rougher, and therefore probably, in windier conditions, sufficient of the bottom regions of the keel structures 29 interact by immersion by the crests of passing waves to provide the required degree of resistance to any transverse forces acting on the vehicle due to beam-on winds, the mean clearance beneath the skirt 12 remaining substantially constant in both conditions. As shown in FIGURE 8, the skirt 12 is able to conform or deflect upwardly as a wave crest is negotiated by the vehicle 10, while the wave crest washes the bottom region of the keel structures 29. This mode of operation is more useful for high speed travel than for low speed travel since at high speeds it is desirable to minimise the drag between the water and the keel structures 29, and the relative importance of transverse forces decreases as the vehicle's speed increases. At low speeds, the drag of the keel structures 29 becomes less important whilst the transverse forces become more significant.

FIGURE 9 depicts a modification of the previous embodiment in which the change between the previously described modes of operation of the vehicle 10 is effected by means of rigid keel structures 29 which are mounted for vertical movement relative to the body 11 of the vehicle 10. The vertical movement of the keel structures relative to the body 11 avoids the need to change the volume rate of air delivered to the cushion space 13 or to relay on the wind/wave-size relationship. The movement of the keel structures 29 is governed by hydraulic rams 30 which can be under the control of the pilot of the vehicle or a speed responsive means such as a Pitot head (not shown).

The change between the various modes of operation can also be enhanced or effected by raising or lowering the flexible skirt 12 relative to the body 11 thus changing the depth of the cushion space 13. The raising and lowering of the flexible skirt 12 can be effected, in all of the described embodiments, by respectively winding-in and paying out the cords 25 against the outwardly acting forces provided by the air cushion 13. In FIGURE 9 the cords 25 are each wound in or paid out by a pulley wheel 31 which is driven through an endless belt 32 by an electric motor 33 under the control of the pilot.

As previously stated, the rigid keel structures 29 can support the vehicle 10 when it is stationary on land. The flexible skirt 12 is then substantially not crumpled between the body 11 and the land surface, and the risk of damage from this cause is reduced. Furthermore, when thus supported, access may be had to the underside of the body 11, particularly on large vehicles. The keel structures 29 can also act as skids for the vehicle 10 over soft land surfaces such as sand or mud. The keel structures 29 also physically stiffen the body 11 of the vehicle.

It is contemplated that the vehicle 10 may be provided with water-screw propellers 19a (shown dotted in FIGURE 8) mounted on a shaft rotatably supported in each of the keel structures 29, instead of the air-screw propeller unit 19, and that the skirt 12 may be so modified that when the longitudinal side sections of the skirt 12 are raised relative to the keels 29, the keels 29 co-operate with the front and rear sections of the skirt 12 to contain an air-cushion beneath the vehicle body 11. This modified form of the vehicle would normally be suitable for water-borne operation, but would be able to travel over land when the longitudinal side sections of the skirt 12 were lowered relative to the keel structures 29. Additional ducting (not shown) would need to be provided to enable air to be supplied between each keel structure 29 and the neighbouring longitudinal side sections of the skirt 12 to form an air cushion in the space therebetween for travel over land.

In the embodiments so far described, the containment of the air cushion 13 has been provided solely by a flexible skirt 12 beneath which there is usually a clearance of one or two inches. In instances where it is desired that there should be a substantially greater clearance between the skirt 12 and the surface 18, one or more jets of fluid may be downwardly discharged from the skirt 12, parallel to the periphery of the air-cushion 13, to provide containment of the air-cushion 13 beneath the level of the skirt 12.

In vertical cross-section through the embodiment of the invention shown in FIGURE 10, the cushion of pressurised air 13 is laterally bounded and contained below the level of the skirt 12 at least at the sides of the vehicle 10 by fluid curtains formed by two spaced-apart jets of air 35, 36 parallel to the periphery of the cushion 13. The air jets 35, 36 are continuously projected downwardly from respective ports 37, 38 formed in the bottom of a skirt 39 in the form of a hollow structure of flexible sheet material (such as rubber sheet or rubberised fabric)

which is attached to the body 11 of the vehicle 10 and which is formed, in effect, by the provision of a membrane between the bottom of the vehicle body 11 inwardly of the sheet 21 of FIGURES 1 to 7 and the lower margin of the sheet 21. The pressurised air is supplied to the hollow skirt 39 from the compressor 15 (or some other convenient source) via conduits 40, and the ports 37, 38 are so arranged that the air jets 35, 36 are downwardly projected, but somewhat inwardly inclined towards the air cushion 13 so that they can help maintain the air cushion 13. The jets 35, 36 are bent outwardly as they approach the surface 18 by the pressure of the air cushion 13. In the space 41 between the parallel jets 35, 36 a subsidiary air cushion is formed which maintains the distance between the bottom of the hollow skirt 39 and the surface 18 at a substantially fixed value, the skirt 39 being able to deform in a vertical sense either locally or as a whole to accommodate varying distances between the surface 18 and the body 11. FIGURE 10 shows this embodiment in the mode of operation suitable where beam-on wind forces can be ignored (e.g. at high speeds in the absence of beam-on winds). In the mode of operation where the keel structures 29 are to penetrate the surface 18 (assuming this to be water), the supply of air to form the jets 35, 36 is reduced or cut off and the volume of air supplied to the cushion space 13 is reduced until the body 11 has moved nearer the surface 18 to enable keel structures 29 to penetrate surface 18. The reduction and control of the volume of air supplied to the air cushion 13 may be derived by controlling the speed of the compressor 15 or by operating valves (not shown) in the ducts 17. The reduction and control of the volume of air supplied to the hollow skirt 39 to maintain the jets 35, 36 may also be achieved by regulation of the speed of the compressor, or by the use of valves in the conduits 40. In FIGURE 10, there are depicted butterfly valves 42 which are pivotally attached to the internal walls of the conduits 40 so as to be pivotable between positions in which they wholly throttle any airflow in conduits 40 and positions in which they have substantially no throttling effect. The movements of the butterfly valves 42 are controlled by the driver of the vehicle 10 through a linkage system (not shown) of the type well know to those skilled in the art. Alternatively, or in addition, the keel structures 29 may be extended downwardly from the body 11 by means of the hydraulic rams 30 (shown dotted), if these are provided.

In a variant of the embodiment of FIGURE 10, the bottom of the hollow skirt 39 may be upwardly retracted against the pressure of the inflating air by means of tie-cords 43, shown dotted, which extend between the interior surface of the bottom of the hollow skirt 39 and a winding drum 44 driven by an electric motor, not visible in the drawing.

Although the jets 35, 36 in FIGURE 10 have been described as being of air, they may alternatively be formed from any other gas such as engine exhaust gases, or any liquid, such as water.

The vehicle 10 may be provided with wheels 45, shown dotted in FIGURE 10, rotatably mounted on the bottom of the rigid keel structures 29 so that the vehicle 10 can operate over relatively even land surfaces in the manner of a conventional wheeled land vehicle when the wheels 45 extend lower than the skirt 39. The provision of the wheels 45 is useful when the vehicle 10 is to be moved slowly around a loading or surfacing area since it provides the capability for precise manoeuvering in a restricted space.

In the vehicle 10 depicted in part in FIGURE 11, the skirt 12 comprises a top section 47 of rubber sheet or rubberised fabric which depends from the peripheral region 48 of the bottom of the vehicle body 11 by its inner and outer edges so as to define a space 49 between the peripheral region 48 and the top section 47 to which air under pressure can be supplied so as to inflate the top section 47 to a desired degree so that it extends downwardly from the body 11 to the required extent. The pressurised air for inflation of the top section 47 of the skirt 12 is supplied at a pressure exceeding the pressure of the air-cushion 13 via a duct 50 from an auxiliary compressor 51 which induces air discharged from the compressor 15 to the ducts 17. To the downwardly presented face of the top section 47 are attached a number of the wall elements 22. The skirt 12 in this form may extend not only along the longitudinal sides of the vehicle 10 but also at the front of the vehicle 10 in place of the relatively tall wall elements 26 shown in FIGURE 1.

The keel structures 53 are constructed of flexible sheet material such as rubber sheet or rubberised fabric and have a hollow bag-like form which is elongated parallel to the fore-and-aft axis of the vehicle 10. The longitudinal walls of each keel structure 53 are each attached to the bottom of the vehicle body 11 on each side of a port 54 formed in the bottom of the body 11. Each port 54 forms the terminus of an air supply duct 55 which receives compressed air from the auxiliary compressor 51 via a delivery duct 56.

When compressed air is delivered from the auxiliary compressor 51 to the ports 54, the hollow keel structures 53 are inflated downwardly. Opposite longitudinal sides of each keel structure 53 are linked by tie-cords 57 so that the keel structures 53 are constrained to assume a desired shape when inflated. Instead of the tie-cords 57, the opposite sides of each keel structure 53 may be linked by vertical diaphragms (not shown) of flexible sheet material. In FIGURE 11, the inflated position of the left hand keel structure 53 is shown in chain-lines, and that of the right-hand keel structure 53 in solid lines. Each keel structure 53, when inflated, interacts with the surface 18 (whether over water or land) beneath the vehicle 10 to resist any transversely acting forces which may be acting on the vehicle 10. A stiffening rib 59 of nylon or hard rubber is bonded to the bottom of each keel structure 53 so that the resistance to transverse forces acting on the vehicle 10 is increased and to protect the keel structure 53. For travel over land surfaces, the stiffening ribs 59 allow the keel structures 53 to skid over irregularities with a relatively small resistance parallel to the length of the keel structures and a relatively large resistance transverse to the length of the keel structures 53.

Each duct 55 incorporates a three way control valve 60 which can connect the upstream and downstream sections of duct 55 for inflating the keel structures 53, or connect the downstream section of each duct 55 to an exhaust duct 61 so that the interior of each keel structure 53 can be put in communication with the atmosphere. When the keel structures 53 and the atmosphere are thus in communication, the pressure of the air-cushion 13 forces the compressed air out of the keel structures 53 until the latter tend to lie against the bottom of the vehicle body 11, as exemplified by the solid outline of the left-hand keel structure 53. The crumpled, deflated keel structure 53 is then substantially clear of the surface 18 for operation in conditions where transverse forces acting on the vehicle 10 are to be ignored.

In order that the keel structures 53 may be more positively retained against the bottom of the vehicle body 11, each may be engaged by a tie-cord 62 which extends upwardly through a seal 63 in the duct 55 to a rotatable winding drum 64 driven through reducing gears (not visible in FIGURE 11) by an electric motor 65 under the control of the vehicle driver. The friction in the reducing gears prevents the weight of the keel structure 53 from rotating the drum 64 when the electric motor 65 is inoperative. Alternatively, or in addition, the keel structures 53 may be retained against the bottom of the vehicle body 11 by suction. Suction may be applied to the keel structures by means of ducts 66 (only one of which is depicted in chain-lines) providing communication between the intake to the compressor 15 and the duct 55.

A valve 67 (shown dotted) regulates the degree of suction which is applied via each duct 66 to the corresponding keel structure 53.

The inflatable keel structures 53 of FIGURE 11 produce drag when they contact the surface 18 beneath the vehicle 10, and this drag may be utilized in a degree, for steering the vehicle. For example, with the vehicle 10 of FIGURE 11, the drag produced by the inflated right-hand keel structure 53 will tend to impede the motion of the right-hand side of the vehicle 10, whilst there will be substantially no such impedance from the deflated left-hand side keel structure 53. Accordingly, the vehicle 10 as depicted in FIGURE 11 will tend to turn to the left, if it is assumed that the vehicle is moving out of the plane of the drawing.

Although all of the described embodiments show gas cushion vehicles having two keel structures, the invention includes gas cushion vehicles having one keel structure or more than two keel structures.

Various combinations of the features disclosed hereinbefore may be employed without thereby departing from the invention as defined by the accompanying claims.

I claim:

1. A gas cushion vehicle for traveling over surfaces of land and water having a fore-and-aft axis and comprising a body, a flexible skirt attached to and depending from the body for laterally containing beneath the body at least one vehicle-supporting cushion of pressurised gas, a pair of laterally spaced keel structures extending downwardly from the body with their lengths stubstantially parallel to the fore-and-aft axis, the keel structures being of substantially rigid construction capable of supporting the vehicle on a hard land surface and at least partly surrounded by the flexible skirt, the width and length of each keel structure being so related that, when in contact with the surface over which the vehicle is traveling, the keel structures provide a relatively small resistance to movement of the vehicle parallel to its fore-and-aft axis and a relatively large resistance to movement transversely of said axis, and means for moving the keel structures vertically relative to the vehicle body.

2. A vehicle according to claim 1 including a waterscrew propeller rotatably mounted on each keel structure for propelling the vehicle relative to water.

3. A vehicle according to claim 1 in which the upper part of the flexible skirt is attached to the periphery of the vehicle body and the interior of said skirt is open to the vehicle-supporting gas cushion beneath the body, whereby, in operation, the skirt is inflatable by the pressurised gas of the cushion to a form in which, in vertical cross-section normal to the periphery of the cushion, it extends generally outwardly from the body, then downwardly, and then inwardly in a substantially smooth curve, and which includes means connected to the lower part of the skirt for raising and lowering the skirt relative to the vehicle body.

4. A vehicle according to claim 3 in which the flexible skirt comprises a succession of wall elements arranged side-by-side, each wall element comprising a downwardly extending wall portion and a pair of spaced-apart side portions extending inwardly from the wall portion towards the cushion, the adjacent side portions of neighbouring wall elements being urged into contact with each other by the pressure of the pressurised gas of the cushion, whereby substantially to prevent the escape of pressurised gas from the cushion between neighbouring wall elements.

5. A gas cushion vehicle for traveling over surfaces of land and water having a fore-and-aft axis and comprising a body, a flexible skirt attached to and depending from the body for laterally containing beneath the body at least one vehicle-supporting cushion of pressurised gas, and a keel structure extending downwardly from the body with its length substantially parallel to the fore-and-aft axis, the keel structure being of substantially rigid construction capable of supporting the vehicle on a hard land surface and at least partly surrounded by the flexible skirt, the width and length of the keel structure being so related that, when in contact with the surface over which the vehicle is traveling, the keel structure provides a relatively small resistance to movement of the vehicle parallel to its fore-and-aft axis and a relatively large resistance to movement transversely of said axis, at least one of said flexible skirt and said keel structure being movable vertically relative to the vehicle body so as to vary the relative downward extent of said skirt and said keel structure.

References Cited

UNITED STATES PATENTS

| | | | |
|---|---|---|---|
| 3,070,327 | 12/1962 | Dornier et al. | 180—116 XR |
| 3,301,343 | 1/1967 | Hardy et al. | 180—116 |
| 3,319,592 | 5/1967 | Hunt | 114—67 |
| 3,330,240 | 7/1967 | Hardy et al. | 114—67 |

ANDREW H. FARRELL, *Primary Examiner.*